United States Patent
Burgess

(10) Patent No.: US 6,459,885 B1
(45) Date of Patent: Oct. 1, 2002

(54) RADIO TRANSCEIVER SWITCHING CIRCUIT

(75) Inventor: Paul Burgess, Bochum (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/397,854

(22) Filed: Sep. 17, 1999

(30) Foreign Application Priority Data

Sep. 18, 1998 (GB) .............................................. 9820469

(51) Int. Cl.$^7$ ................................................ H01Q 1/36
(52) U.S. Cl. .......................... 455/83; 455/78; 455/275; 455/277.1
(58) Field of Search .......................... 455/83, 78, 275.1, 455/277.1; 333/103

(56) References Cited

U.S. PATENT DOCUMENTS 4,525,863 A    7/1985   Stites ........................... 455/83
5,475,875 A  * 12/1995  Katsuyama et al. ......... 327/408
5,789,995 A  *  8/1998  Minasi ......................... 333/103
6,122,488 A  *  9/2000  Leizerovich et al. ........ 330/251

FOREIGN PATENT DOCUMENTS

GB    2273423    6/1994    ............ H04B/1/44

* cited by examiner

*Primary Examiner*—Daniel Hunter
*Assistant Examiner*—Alan T. Gantt
(74) *Attorney, Agent, or Firm*—Antonelli, Terry, Stout & Kraus, LLP

(57) ABSTRACT

A radio transceiver circuit which includes an antenna, a transmitter, a receiver, an antenna switching circuit for selectively connecting the transmitter and the receiver to the antenna, and a power source for driving the transmitter and the receiver. The antenna switching circuit includes two semiconductor elements. The current ($I_{BRX}$, $I_{BTX}$) provided by the power source to the receiver and to the transmitter is directed through the respective semiconductor elements which are each set to its conductive electrical state by the respective current ($I_{BRX}$, $I_{BTX}$) and thereby selectively coupling the radio signal between the receiver and the transmitter to the antenna.

10 Claims, 2 Drawing Sheets

RADIO TRANSCEIVER SWITCHING CIRCUIT

BACKGROUND OF THE INVENTION

The invention is generally related to radio transceiver circuits and particularly but not exclusively to pin diode switches used for switching radio transceivers. Known radio transceiver circuits with a receiver and a transmitter usually use one common antenna for transmitting and receiving radio signals. A switch connects either the input line of the receiver or the output line of the transmitter to the antenna.

This switch can be a single pole double throw type and is required to isolate the transmitter from the receiver in receive mode and to isolate the receiver from the transmitter in transmit mode. In its off mode it also provides a high impedance for matching. Due to its functions it is referred to as a transmit/receive switch or T/R switch.

There are a number of solutions for implementing the transmit/receive switch. The important considerations are size, cost, insertion loss and power consumption of the switches.

For example in mobile phone handsets it is common to use GaAs FET switches which are readily commercially available but are expensive and relatively large. They generally require two control lines to provide the bias voltages for turning on the transistors.

Another possible type of transmitt/receive switch is a PIN diode switch which is physically smaller and cheaper than transistor switches. A PIN diode switch presents a high impedance to RF frequencies unless a DC bias current is present. When a DC bias current is passed through the diode, the diode is turned on and provides a low resistance RF path between anode and cathode of the diode.

For the purpose of connecting an antenna to the receiver or transmitter the PIN diodes are typically coupled together with their cathodes. They are selectively biased by a bias current provided by a switchable power supply. If the power supply for one PIN diode is turned on a bias current flows through the pin diode and if this is e.g. the PIN diode in the receiver path a signal received by the antenna passes the PIN diode, which is now in its conductive state and enters the receiver input stage. The PIN diode in the transmitter path, which is not biased during receive mode, isolates the antenna from the transmitter output stage at the same time.

For this solution blocking capacitors are necessary to isolate the transmitter, the receiver and the antenna from the DC bias current. At least three RF chokes are needed for blocking the RF frequency signal from the common ground of the transceiver and from the power supply.

One further disadvantage of using PIN diodes the way described above is that an additional current of approximately 10 mA is required for biasing the PIN diodes. This additional current consumption can significantly reduce the standby and talk times of handheld radio communication devices like mobile phones which are powered by a single battery. Additionally two control lines and switches are required for the control of the bias currents.

One problem with PIN diode switches is that the isolation of the PIN diode switch may not be high enough when the PIN diode is not biased to repress the transmitted signal from the receiver input. Therefore it might be necessary to provide a negative bias current for the PIN diode in the receive path, but providing a negative voltage is also undesirable.

SUMMARY OF THE INVENTION

In accordance with a first aspect of the invention there is provided radio transceiver circuit comprising an antenna, a transmitter, a receiver, an antenna switching circuit for selectively connecting the transmitter and the receiver to the antenna, and a power source for both the transmitter and the receiver, the antenna switching circuit having two semiconductor elements, each having a conductive electrical state and a substantially non-conductive electrical state, one of the semiconductor elements being coupled between the antenna and the transmitter, the other of semiconductor elements being coupled between the antenna and the receiver, whereby the power source is operable to provide the current for powering the transmitter during operation of the transmitter and the receiver during operation of the receiver, current being sought by the transmitter setting the one semiconductor element to its conductive electrical state, current being sought by the receiver setting the other semiconductor element to its conductive electrical state thereby selectively coupling the receiver and the transmitter to the antenna.

The semiconductive elements are preferably PIN diodes.

The power supply (Vcc) for biasing the PIN diodes and supplying the transmitter and receiver with the needed biasing current is advantageously connected to the circuit node where the antenna is connected to the anodes or cathodes (dependent on the sign of the power supply) of the PIN diodes through a choke.

The choke which is coupled between the power source and the antenna is having a high impedance for RF signals and a low impedance for DC signals in order to provide the DC current for the PIN diodes, the receiver and transmitter circuit and block the RF signal from the power supply.

Furthermore the choke can be one of the matching components for the antenna which is used for providing the correct impedance matching for the antenna.

In a preferred embodiment of the invention the transmitter and the receiver circuit include open collector output stages. The power amplifier of the transmitter contains an open collector output stage and the bias current is feeding directly into the output of the power amplifier for biasing. This bias current is also used for biasing the PIN diode in the path between the antenna and the transmitter. This power amplifier could be advantageously the last power amplifier stage of the transmitter.

Also components of the receiver, for example a mixer of the receiver, could contain an open collector output stage and the mixer of the receiver requires the current which is used for biasing the PIN diode which is coupled between the antenna and the receiver.

In a further advantageous embodiment of the invention the transmitter is operated with a balanced output signal. This means that the power amplifier of the transmitter produces a first output signal with the half of the amplitude required for transmission and a second output signal also with the half of the amplitude required for transmission which is inverted to the first output signal. The second output signal is phase shifted by a phase shifting element, which can be for example a balun, and added to the first output signal to provide the required transmitter output signal.

The summation signal of the inverted and non-inverted transmitter output signal is then connected to the PIN diode in the transmitter path and the output signal of the transmitter is connected to the antenna during operation of the transmitter.

In accordance with a further aspect of the invention, there is provided a method of operating a semiconductor element switch of a transceiver, for selectively coupling an antenna to the transmitter and receiver, the semiconductor element switch having two semiconductor elements each having a conductive electrical state and a substantially non-conductive electrical state, the current sought from a power source by a transmitter of the transceiver during operation of the transmitter or by a receiver of the transceiver during operation of the receiver being used to set the respective semiconductor element into a conductive electrical state thereby connecting the antenna to the transmitter during operation of the transmitter and to the receiver during operation of the receiver.

In accordance with a yet further aspect of the invention there is provided a radio transceiver circuit comprising a transmitter having means for providing a balanced output signal with an inverted output signal and a non inverted output signal, and a receiver, the inverted transmitter output signal is phase shifted by a first phase shifting element and a second phase shifting element and combined with the non inverted output signal to provide an output signal, the first and second phase shifting elements are arranged such that the combined signal of the inverted and non inverted transmitter output signals is substantially zero at a node where the two phase shifting elements are coupled together, and said receiver is coupled to said node.

An embodiment of invention is obtained by using two phase shifting elements, i.e. baluns, instead of one phase shifting element in the transmitter path. The phase shifting elements are arranged in a way that the sum of the signals of the inverted and non-inverted transmitter output signal becomes substantially zero at the connection point of the phase shifting elements.

The input line of the receiver is connected to the connection point of the two phase shifting element.

While the transmitter is operating the signal at the connection point of the phase shifting elements is substantially zero and the receiver does not receive any signal this time even if it is connected to the transmitter path. While the transmitter is not operating a signal expected by the receiver can be obtained from the connection point of the two baluns.

In a preferred embodiment of this variant of the invention two PIN diodes for de-coupling the transmitter circuitry from the receiver circuitry are located within the inverted and non inverted output signal path of the transmitter providing a balanced output signal. While the transmitter is not operating these PIN diodes are in their non-conductive electrical state because the transmitter does not require a current for operation which bias the PIN diodes.

This invention facilitates a receive path from the antenna to the receiver without using any kind of switching or de-coupling element for de-coupling the receiver path from the antenna path.

BRIEF DESCRIPTION OF THE DRAWINGS

The present invention will now be described by way of example, with reference to the accompanying drawings, in which.

DETAILED DESCRIPTION OF THE DRAWINGS

Figure 1:
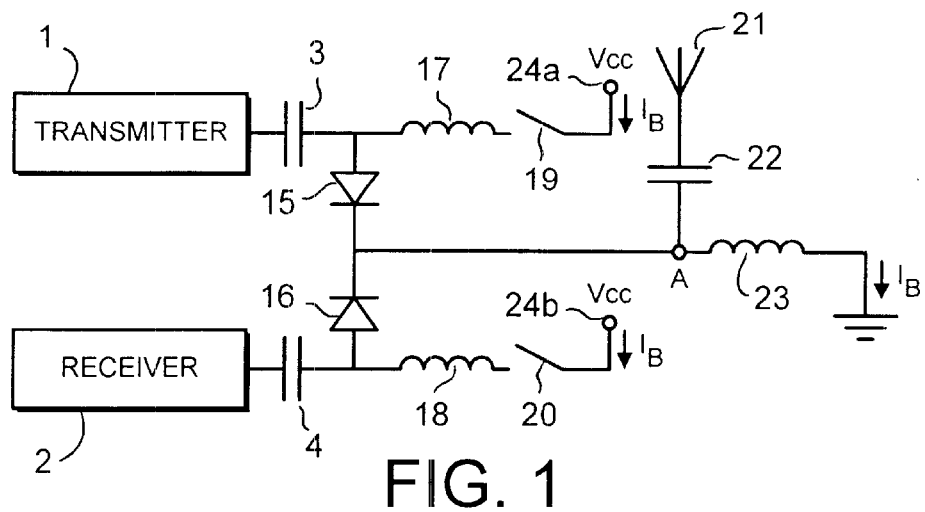
FIG. 1 shows a transceiver with a PIN diode switch for coupling and decoupling a transmitter and a receiver according to the prior art

Referring to FIG. 1 of the drawings there is shown a transceiver circuit according to the prior art with a transmitter 1 and a receiver 2. Transmitter 1 and receiver 2 are coupled to a circuit node A via DC-blocking capacitors 3 and 4 and PIN diodes 15 and 16 having their cathodes coupled together. Antenna 21 is connected to the circuit node A via a DC blocking capacitor 22.

During transmitter operation the switch 19 is closed and a biasing current $I_B$ is feeding from the power source 24a through switch 19, choke 17, PIN diode 15 and choke 23 to ground. This way the diode 15 is set into its conductive electrical state and the signal to be transmitted can pass from transmitter 1 through PIN Diode 15 through capacitor 22 to the antenna 21.

During transmit mode switch 20 is in its open position. This way PIN diode 16 is not biased and it is in its substantially non conductive electrical state for decoupling the receiver from the transmitter path.

Switches 19 and 20 may be controlled by a microprocessor which also controls other operations of the transceiver.

For transceivers having a transmitter with a high power output level it might be necessary to bias PIN diode 16 with a negative voltage to improve the isolation of the diode.

In receive mode switch 20 is closed and the PIN diode 16 is biased this way. Switch 19 is opened to set pin diode 15 in a non-conductive electrical state. A signal received by antenna 21 passes through capacitor 22 and PIN diode 16, DC blocking capacitor 4 to the input stage of receiver 2.

The main disadvantage for this kind of transceiver switching circuit is that the current $I_B$ is only needed for biasing the PIN diodes 15 and 16 in transmit and receive mode. In each case an external current must be supplied by the control circuitry to bias the PIN diodes. Furthermore the blocking capacitors 3 and 4 are necessary to isolate the transmitter output stage and the receiver input stage from the DC bias current. Another disadvantage is that two control lines containing the switches 19 and 20 and the chokes 17 and 18 are required.

Figure 2:
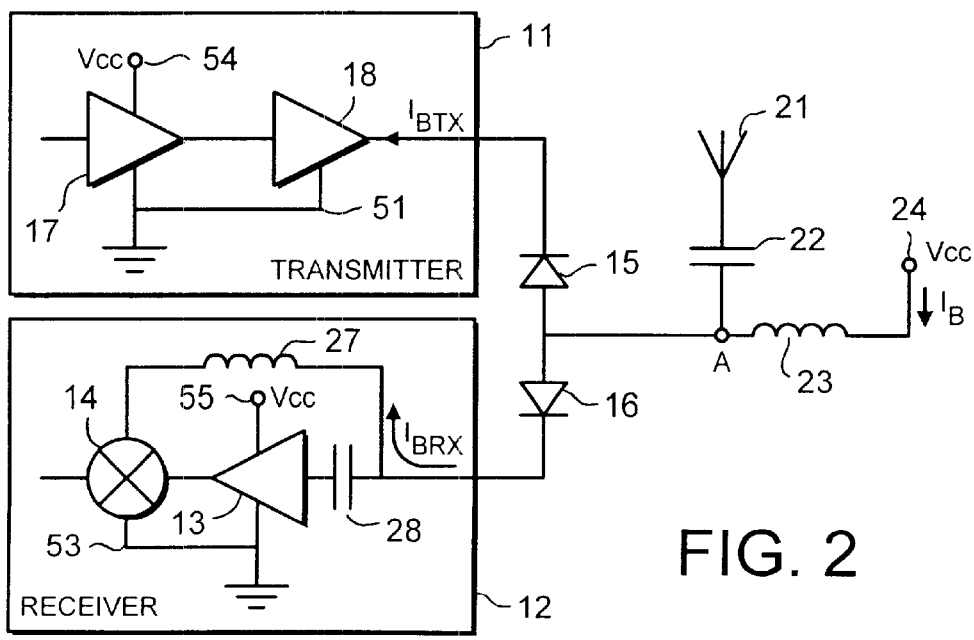
FIG. 2 shows a transceiver with a PIN diode switch for coupling and decoupling a transmitter and a receiver according to the invention

Referring now to FIG. 2 a transceiver circuit according to the invention is shown. The radio transceiver circuit basically comprises an antenna 21, a transmitter 11, a receiver 12, an antenna switching circuit connecting the transmitter 11 and the receiver 12 to the antenna 21 and a power source Vcc 24.

The antenna switching circuit is a construction of two semiconductor elements, namely PIN diodes 15 and 16, having a conductive electrical state and a substantially non-conductive electrical state coupled together with their anodes which are connected to the circuit node A and by this to the antenna 21. Antenna 21 is coupled through DC blocking capacitor 22 to circuit node A. The power source Vcc 24 is coupled through the RF blocking choke 23 to the circuit node A.

The currents $I_{BTX}$, $I_{BRX}$ sought from the power source by means of receiver 12 or transmitter 11 during operation of said means are directed through the respective PIN diodes (15, 16) which are set to their conductive electrical state by this currents and thereby the transmitter is connected to the antenna when the transmitter is in operation and the receiver is coupled to the antenna when the receiver is in operation.

As shown in FIG. 2 the current $I_{BTX}$ biasing the PIN diode 15 during transmit mode also enters the output of the final power amplifier 18. Power Amplifier 18 contains an open collector output stage which is known to persons skilled in the art. The current $I_{BTX}$ is feeding into the output of the amplifier 18 for biasing the transmitter 14 during transmit mode.

PIN diode 15 is turned on automatically by the bias current $I_{BTX}$ of the power amplifier 18. The bias current $I_{BTX}$ is feeding from the power source Vcc 24 through choke 23 and PIN diode 15 to the power amplifier 18 and through line 51 to ground.

While the transmitter 11 is operating the receiver 12 is turned off. Therefore no current $I_{BRX}$ is biasing PIN diode 16 during transmit mode and PIN diode 16 is in its substantial non conductive electrical state and the transmitter output signal does not reach the receiver input stage.

The power amplifier 17 uses an own power source 54 but it has to be understood if for example the bias current sought by the power amplifier 18 is not high enough for biasing PIN diode 15 the bias currents of power amplifiers 17 and 18 can be coupled together for biasing PIN diode 15. Furthermore it is possible only to use the bias current sought by power amplifier 17 that may be sufficient to bias PIN diode 15 and set it into its electrically conductive state. The bias currents sought by any parts of transmitter 11 can be chosen such that a minimum but sufficient current $I_{BTX}$ is fed through the PIN diode for biasing.

The receiver 12 of FIG. 2 contains basically a Low Noise Amplifier (LNA) 13 and a mixer 14. During operation of receiver 12 the mixer 14 and the LNA 13 require bias currents for their open collector output stages. In this case the bias current of the mixer 14 is used to bias also the PIN diode 16. The bias current $I_{BRX}$ is feeding from power source Vcc 24 through choke 23, pin diode 16 and RF choke 27 to the mixer 14 for biasing the mixer 14 and through connection line 53 to ground. LNA 13 is connected to a supplementary power source 55 for biasing.

Also for the receiver part it may be possible to use the biasing current of the LNA 13 if it is high enough for biasing the PIN diode 16 or to couple together the bias currents of mixer 14 and LNA 13 for biasing the PIN diode 16. Also bias currents used by any other stages of the receiver could be used for biasing PIN diode 16. Also the mixer 14 in this case contains an open collector output stage and the current $I_{BRX}$ is used for biasing.

While the receiver is in operation the PIN diode 16 is biased and a radio frequency signal received by antenna 21 is passing DC blocking capacitor 22, PIN diode 16 and reaches the input stage of Low Noise Amplifier LNA 13 where the radio frequency signal will be amplified. The signal leaving the LNA 13 is then down-converted by the mixer 14 to an intermediate frequency. Further receiver stages may be necessary to amplify and down-convert the received signal. The signal leaving receiver 12 is further processed and could be finally fed to a loudspeaker for speech transmission or to a microprocessor for data transmission. A DC blocking capacitor 28 is used to block the bias current $I_{BRX}$ from the input stage of LNA 13.

It will be appreciated by a person skilled in the art that no extra current consumption is endured since the PIN diodes bias currents are shared with the transmitter and receiver bias currents. This increases for example the standby and talk times for example of a mobile telephone, a cordless telephone or any other radio communication device powered by a battery. Furthermore no control lines or extra control logic is required since the bias currents are automatically present in the relevant (TX and RX) modes of operation. A further advantage compared to the prior art as presented with reference to FIG. 1 is that DC blocking capacitor 3, chokes 17 and 18 and switches 19, 20 can be saved.

The PIN diode bias currents are now regulated by the open collector output stages and so they are less susceptible to noise which could otherwise disturb the system.

Figure 3:
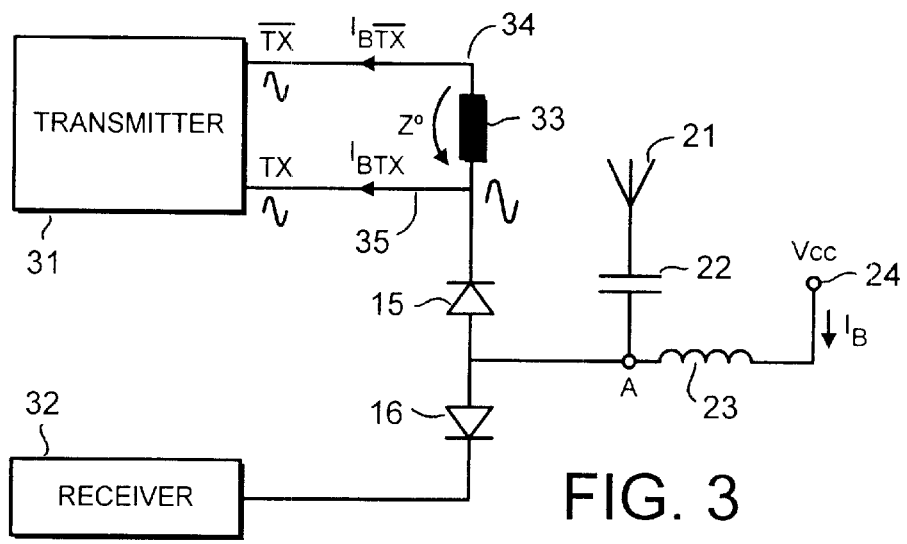
FIG. 3 shows a transceiver according to the invention with a balanced power amplifier output signal

FIG. 3 shows a variant of the transceiver circuit presented in FIG. 2 which is substantially the same except the output stage of transmitter 31. Transmitter 31 contains a balanced output signal. This balanced output signal is characterised by an non-inverted output signal TX and an inverted output signal $\overline{TX}$. Both output signals have about the half amplitude of the final output signal which is fed to the antenna 21. In order to obtain the final output signal the inverted output signal $\overline{TX}$ is phase shifted by a delay line 33. Delay line 33 can be for example a balancing transformer which is known as a balun to persons skilled in the art.

Balun 33 shifts the inverted output signal for Z degrees. Z is 180 in general but for systems where the output frequency varies between two frequencies, known as frequency bands, the balun is designed in a way that a ideal 180 degree phase shift is obtained for a frequency in the middle of this band and an acceptable phase shift is obtained for the lowest and the highest possible frequency of the output signal.

For example if the output frequency of the transmitter varies between 2.4 GHz and 2.5 GHz the balun is designed for 180 degree phase shift at 2.45 GHz. The inverted and non-inverted output signal are combined at the cathode of PIN diode 15.

The optimal output signal is reached at 2.45 GHz but also for transmit frequencies of 2.4 and 2.5 GHz a loss of about 1.5 dB at this borders is acceptable.

Within transmitter 31 power amplifiers for the inverted output signal and for the non-inverted output signal require currents for biasing their open collector output stages. This current is sought from the power source 24 through choke 23 and PIN diode 15 and is then divided into the inverted and non-inverted signal path, i.e. the currents $I_{\overline{BTX}}$ and $I_{BTX}$. The sum of these two currents is used for biasing PIN diode 15 and set it to its conductive electrical state.

The operation of receiver 32 is the same as the operation of receiver 12 in FIG. 1. Receiver 32 might also be a receiver with a balanced input signal with means for phase shifting one half of the incoming signal.

Also the circuit of FIG. 3 uses the advantages of the invention as they are presented in FIG. 2, i.e. the currents for biasing transmitter and receiver stages are used for biasing the respective PIN diodes in the transmitter and receiver path to the antenna.

Also the number of needed components is reduced compared to the switch construction of FIG. 1.

Figure 4:
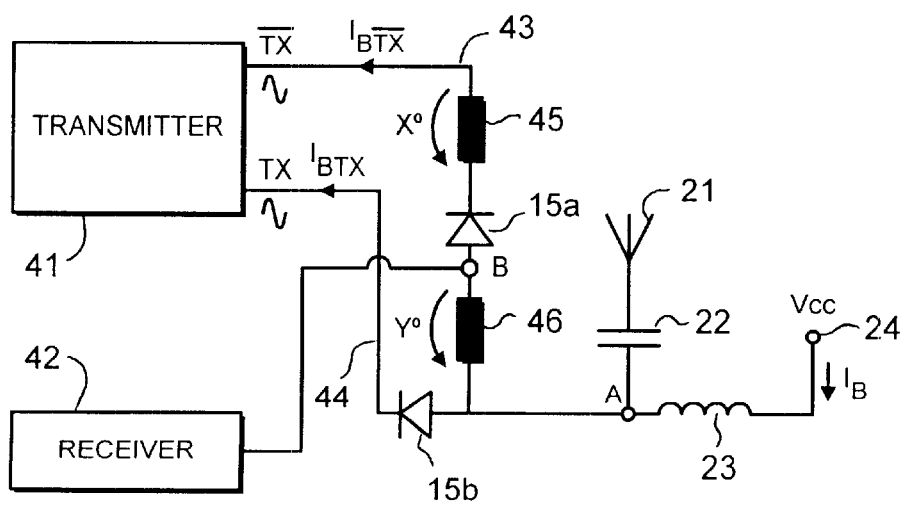
FIG. 4 shows a transceiver with a balanced power amplifier output signal according to an advantageous variant of the invention

The circuitry as it is shown in FIG. 4 also takes advantage of the fact that a current sought by the transmitter for biasing the open collector output stages is used for biasing the PIN diode 15a and 15b but for obtaining a good, isolation of the input stage of receiver 32 to the transmitter output signal another approach is disclosed.

The output signal of the transmitter 31 is balanced like it is presented with reference to FIG. 3 and the accompanying description and consists of an inverted and non-inverted output signal. Instead of using one balun for phase shifting two baluns 45 and 46 are used for phase shifting. The first balun 45 shifts the inverted transmitter output signal $\overline{TX}$ for X degrees. X should be substantially around 90 degree ((/4). Balun 46 shifts the inverted output signal again for 90 degrees (phase shift $Y^o$), in order to obtain a 180 degree phase shift as described above. Both output signals are combined at circuit node A and the obtained total transmitter output signal is send out through antenna 21.

The advantage of this kind of phase shifting with baluns 45 and 46 is, that the non-inverted output signal TX of transmitter 31 also passes the balun 46 where it is (/4 shifted and meets the inverted and (/4 phase shifted output signal $\overline{TX}$ at connection node B.

The combination in connection node B of the two signals TX and $\overline{TX}$ leads to a signal with no amplitude at this node (Zero point). It could be possible that also other parts of the switching circuit have got a phase shifting effect, therefore the baluns 45 and 46 have to be dimensioned in a way that these effects are extinguished and the transmitter signal is substantially zero in connection node B.

The input stage of receiver 42 is connected to connection node B. During transmitter operation no signal from the transmitter path enters the receiver path, this way the receiver is ideally isolated from the transmitter path even if it is directly connected to it at connection node B.

During receiver operation a received signal is fed through antenna 21, capacitor 22, balun 46 to the input stage of receiver 32. This signal is phase shifted also by balun 46 but this does not have any further technical effect on the received radio frequency signal.

The PIN diodes 15a and 15b de-couple transmitter 31 from the received signal during receive mode. While transmitter 31 is operating the currents $I_{\overline{BTX}}$ and $I_{BTX}$ for biasing the power amplifier are also fed through PIN diodes 15a and 15b for turning them on and the transmit signals can pass to antenna 21. During receiver operation, i.e. the transmitter is turned off, the PIN diodes 15a, 15b are not biased and therefore in their non conductive electrical state and the received signal passing from the antenna 21 to the receiver input stage does not enter the transmitter output stages.

The receiver may also obtain its biasing current for one or more open collector output stages from power source 24 but this is not necessary with regard to the invention because the biasing current is not needed for biasing any PIN diode in the receiver path.

PIN diode 15a, which de-couples the inverted transmitter output stage during receive mode, is positioned between balun 45 and connection node B with the cathode connected to balun 45 and the anode coupled to the circuit node B.

PIN diode 15b, which de-couples the non-inverted transmitter output stage during receive mode, is positioned between circuit node A and the non-inverted transmitter output stage.

In an alternative embodiment of the invention the power source Vcc 24 together with RF blocking choke 23 can be directly connected to connection node B or any other usable point where it supplies the transmitter with current and bias the PIN diodes (15a, 15b) while the transmitter 41 is operating.

The present invention may include any novel feature or combination of features disclosed herein either explicitly or implicitly or any generalisation thereof irrespective of whether or not it relates to the presently claimed invention or mitigates any or all of the problems addressed. In view of the foregoing description it will be evident to a person skilled in the art that various modifications may be made within the scope of invention.

What is claimed is:

1. A radio transceiver circuit comprising:
   an antenna;
   a transmitter;
   a receiver;
   an antenna switching circuit for selectively connecting the transmitter and the receiver to the antenna; and
   a power source for both the transmitter and the receiver,
   wherein the antenna switching circuit includes two semiconductor elements, each having a conductive electrical state and a substantially non-conductive electrical state, one of the semiconductor elements being coupled between the antenna and the transmitter, the other of the semiconductor elements being coupled between the antenna and the receiver,
   wherein the power source is operable to provide the current for powering the transmitter during operation of the transmitter and the receiver during operation of the receiver, current being sought by the transmitter setting the one semiconductor element to its conductive electrical state, current being sought by the receiver setting the other semiconductor element to its conductive electrical state thereby selectively coupling the receiver and the transmitter to the antenna, and
   wherein an amplifier of the transmitter includes an open collector output stage requiring a bias current which is used to bias the semiconductor element which is coupled between the transmitter and the antenna.

2. A radio transceiver circuit comprising:
   an antenna;
   a transmitter;
   a receiver;
   an antenna switching circuit for selectively connecting the transmitter and the receiver to the antenna; and
   a power source for both the transmitter and the receiver,
   wherein the antenna switching circuit includes two semiconductor elements, each having a conductive electrical state and a substantially non-conductive electrical state, one of the semiconductor elements being coupled between the antenna and the transmitter, the other of the semiconductor elements being coupled between the antenna and the receiver,
   wherein the power source is operable to provide the current for powering the transmitter during operation of the transmitter and the receiver during operation of the receiver, current being sought by the transmitter setting the one semiconductor element to its conductive electrical state, current being sought by the receiver setting the other semiconductor element to its conductive electrical state thereby selectively coupling the receiver and the transmitter to the antenna, and
   wherein the amplifier of the transmitter requiring the current which is used for biasing the semiconductor element in the transmitter path is the last power amplifier stage.

3. A radio transceiver circuit comprising:
   an antenna;
   a transmitter;
   a receiver;
   an antenna switching circuit for selectively connecting the transmitter and the receiver to the antenna; and
   a power source for both the transmitter and the receiver,
   wherein the antenna switching circuit includes two semiconductor elements, each having a conductive electrical state and a substantially non-conductive electrical state, one of the semiconductor elements being coupled between the antenna and the transmitter, the other of the semiconductor elements being coupled between the antenna and the receiver, wherein the power source is operable to provide the current for powering the transmitter during operation of the transmitter and the receiver during operation of the receiver, current being sought by the transmitter setting the one semiconductor element to its conductive electrical state, current being sought by the receiver setting the other semiconductor element to its conductive electrical state thereby selectively coupling the receiver and the transmitter to the antenna, and wherein a mixer of the receiver requires the current which is used for biasing the semiconductor element which is coupled between the receiver and the antenna.

4. A radio transceiver circuit comprising:

an antenna;

a transmitter;

a receiver;

an antenna switching circuit for selectively connecting the transmitter and the receiver to the antenna; and a power source for both the transmitter and the receiver, wherein the antenna switching circuit includes two semiconductor elements, each having a conductive electrical state and a substantially non-conductive electrical state, one of the semiconductor elements being coupled between the antenna and the transmitter, the other of the semiconductor elements being coupled between the antenna and the receiver, wherein the power source is operable to provide the current for powering the transmitter during operation of the transmitter and the receiver during operation of the receiver, current being sought by the transmitter setting the one semiconductor element to its conductive electrical state, current being sought by the receiver setting the other semiconductor element to its conductive electrical state thereby selectively coupling the receiver and the transmitter to the antenna, and wherein the transmitter is having a balanced output signal with an inverted output signal path and a non inverted output signal path.

5. A radio transceiver circuit according to claim 4, wherein the inverted output signal path is phase shifted and added to the non inverted signal path.

6. A radio transceiver circuit according to claim 5, wherein the summation signal of the inverted and non inverted output signal path is connected to the semiconductor element.

7. A radio transceiver circuit comprising:

a transmitter having means for providing a balanced output signal with an inverted output signal and a non inverted output signal; and a receiver, wherein the inverted transmitter output signal is phase shifted by a first phase shifting element and a second phase shifting element and combined with the non inverted output signal to provide an output signal, wherein the first and second phase shifting elements are arranged such that the combined signal of the inverted and non inverted transmitter output signals is substantially zero at a node where the two phase shifting elements are coupled together, and wherein said receiver is coupled to said node.

8. A radio transceiver circuit according to claim 7, further comprising:

semiconductor elements having a conductive electrical state and a substantially non-conductive electrical state positioned in the paths of the inverted and non-inverted output signals of the transmitter.

9. A radio transceiver circuit according to claim 8, further comprising a power source operable to provide current for powering the transmitter, the current is directed through the semiconductor elements, which are set to their conductive electrical state by said current.

10. A radio transceiver circuit comprising:

an antenna;

a transmitter;

a receiver;

an antenna switching circuit for selectively connecting the transmitter and the receiver to the antenna; and a power source for both the transmitter and the receiver, wherein the antenna switching circuit includes two semiconductor elements, each having a conductive electrical state and a substantially non-conductive electrical state, one of the semiconductor elements being coupled between the antenna and the transmitter, the other of the semiconductor elements being coupled between the antenna and the receiver, wherein the power source is operable to provide the current for powering the transmitter during operation of the transmitter and the receiver during operation of the receiver, current being sought by the transmitter setting the one semiconductor element to its conductive electrical state, current being sought by the receiver setting the other semiconductor element to its conductive electrical state thereby selectively coupling the receiver and the transmitter to the antenna, and wherein said phase shifting elements are baluns.

\* \* \* \* \*